United States Patent [19]

Brothers et al.

[11] Patent Number: 5,779,787
[45] Date of Patent: Jul. 14, 1998

[54] WELL CEMENT COMPOSITIONS CONTAINING RUBBER PARTICLES AND METHODS OF CEMENTING SUBTERRANEAN ZONES

[75] Inventors: Lance E. Brothers, Ninnekah; David D. Onan, Duncan; Rickey L. Morgan, Comanche, all of Okla.

[73] Assignee: Halliburton Energy Services, Inc., Duncan, Okla.

[21] Appl. No.: 912,136

[22] Filed: Aug. 15, 1997

[51] Int. Cl.$^6$ .................. C04B 18/22; C04B 24/24; C04B 16/04

[52] U.S. Cl. .................. 106/802; 106/724; 106/725; 106/809; 106/823; 106/697; 106/708; 106/778; 106/781; 106/696; 166/293; 405/267; 523/130

[58] Field of Search .................. 106/724, 725, 106/708, 778, 781, 696, 802, 809, 823, 697; 166/293, 294; 523/130; 405/267

[56] References Cited

U.S. PATENT DOCUMENTS

| | | | |
|---|---|---|---|
| 3,901,316 | 8/1975 | Knapp | 166/250 |
| 4,256,503 | 3/1981 | Tsuda et al. | 106/100 |
| 4,397,354 | 8/1983 | Dawson et al. | 166/294 |
| 4,916,012 | 4/1990 | Sawanobori et al. | 428/367 |
| 5,032,181 | 7/1991 | Chung | 106/717 |
| 5,258,222 | 11/1993 | Crivelli | 428/323 |
| 5,293,938 | 3/1994 | Onan et al. | 166/293 |
| 5,391,226 | 2/1995 | Frankowski | 106/696 |
| 5,398,759 | 3/1995 | Rodrigues et al. | 166/293 |
| 5,456,751 | 10/1995 | Zandi et al. | 106/724 |
| 5,569,324 | 10/1996 | Totten et al. | 166/293 |
| 5,688,844 | 11/1997 | Chatterji et al. | 166/293 |

OTHER PUBLICATIONS

Publication entitled "Rubber-Tire Particles As Concrete Aggregate" by Neil N. Eldin et al. published in the Journal of Materials In Civil Engineering, vol. 5, No. 4, pp. 478-496 Nov. 1993.

Publication entitled "The Properties of Rubberized Concretes" by I.B. Topcu published in the Cement and Concrete Research Journal, vol. 25, No. 2, pp. 304-310 (1995) (no month).

*Primary Examiner*—Michael Marcheschi
*Attorney, Agent, or Firm*—Craig W. Roddy

[57] ABSTRACT

The present invention provides resilient cement compositions and methods which are particularly useful in the construction and repair of oil and gas wells. The compositions have improved expansion properties and are basically comprised of a hydraulic cementitious material, rubber particles derived from automobile tires, sufficient water to form a pumpable slurry, and a dispersing agent.

10 Claims, No Drawings

WELL CEMENT COMPOSITIONS CONTAINING RUBBER PARTICLES AND METHODS OF CEMENTING SUBTERRANEAN ZONES

BACKGROUND OF THE INVENTION

1. Field of the Invention

The present invention relates generally to cementing subterranean wells, and more particularly, to cement compositions and methods whereby the compositions contain rubber particles derived from recycled automobile tires.

2. Description of the Prior Art

In cementing operations carried out in oil and gas wells, a hydraulic cement composition is pumped by way of the well bore across a zone or formation to be cemented and allowed to set therein. In primary cementing, a hydraulic cement composition is pumped into the annulus between the walls of the well bore and the exterior of a pipe, e.g., casing, disposed therein. The cement composition is permitted to set in the annulus thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

Set cement in wells, and particularly the set cement forming the cement sheath in the annulus of high temperature wells, often fail due to shear and compressional stress exerted on the set cement. The term "high temperature well" as used herein means a well wherein fluids injected into the well or produced from the well by way of the well bore cause a temperature increase of at least about 100° F. over initial cement setting conditions. The stress referred to herein is defined as the force applied over an area resulting from a strain caused by the incremental change of a body's length or volume. The stress is generally related to strain by a proportionality constant known as Young's Modulus. Young's Modulus has a different value for each type of material. In well bore sealing, Young's Modulus for non-foamed cements is about $3\times10_6$ $lb_f$ per sq. inch, and for steel casing about $30\times10_6$ $lb_f$ per sq. inch.

There are several stress conditions associated with cement sheath failures. One such condition is the result of relatively high fluid pressures and/or temperatures inside of pipe cemented in the well bore during testing, perforating, fluid injection or fluid production. The high internal pipe pressure and/or temperature results in expansion of the pipe, both radially and longitudinally which places stresses on the cement sheath causing it to crack, or the bond between the outside surface of the pipe and the cement sheath to fail in the form of loss of hydraulic seal. Another condition results from exceedingly high pressures which occur inside the annular cement sheath due to the thermal expansion of fluids trapped within the cement sheath. This condition often occurs as a result of high temperature differentials created during production or injection of high temperature fluids through the well bore, e.g., wells subjected to steam recovery processes or the production of hot formation fluids through the well bores of high temperature wells. Typically, the pressure of the trapped fluids exceeds the collapse pressure of the cemented pipe causing leaks or failure. Yet another condition occurs as a result of outside forces exerted on the cement sheath due to formation shifting and overburdened pressures.

When such stresses are exerted on the set cement in the well bore, the set cement can fail in the form of radial or circumferential cracking of the cement as well as in the break down of the bonds between the cement and pipe or between the cement and the formation. The failure of the set cement (due to the loss of hydraulic seal of the annulus) can result in lost production, environmental pollution, hazardous rig operations and/or hazardous production operations. A common hazard is the presence of pressure at the well head in the form trapped gas between casing strings.

Moreover, the development of wells including one or more laterals to increase production has recently taken place. Such multi-lateral wells include vertical or deviated (including horizontal) principal well bores having one or more ancillary laterally extending well bores connected thereto. Drilling and completion equipment has been developed which allows multiple laterals to be drilled from a principal cased and cemented well bore. Each of the lateral well bores can include a liner cemented therein which is tied into the principal well bore. The lateral well bores can be vertical or deviated and can be drilled into predetermined producing formations or zones at any time in the productive life cycle of the well.

In both conventional single bore wells and multi-lateral wells having several bores, the cement composition utilized for cementing casing or liners in the well bores must develop high bond strength after setting and also have sufficient resiliency, i.e., elasticity and ductility, to resist loss of pipe or formation bond, cracking and/or shattering as a result of pipe movement, impacts and/or shocks subsequently generated by drilling and other well operations. The bond loss, cracking and/or shattering of the set cement allows leakage of formation fluids through at least portions of the well bore or bores which can be highly detrimental.

In multi-lateral wells wherein pipe has been cemented in well bores using conventional well cement slurries which set into brittle solid masses, the brittle set cement cannot withstand impacts and shocks subsequently generated by drilling and other well operations carried out in the multiple laterals without cracking or shattering.

Thus, there are needs for well cement compositions and methods whereby after setting the cement compositions are highly resilient and can withstand the above described stresses without failure. That is, there is a need for well cement compositions and methods whereby the compositions set into adequate strength masses (>100 psi compressive strength) having improved mechanical properties including elasticity and ductility.

SUMMARY OF THE INVENTION

The present invention provides highly resilient well cement compositions having improved mechanical properties including elasticity and ductility and methods of using the compositions which meet the needs described above and overcome the deficiencies of the prior art. A preferred well cement composition of this invention is comprised of a hydraulic cement, rubber particles present in an amount sufficient to increase expansion properties of the composition, and sufficient water to form a pumpable slurry.

The methods of the invention basically comprise the steps of introducing a well cement composition of this invention which sets into a high bond strength, highly resilient solid mass having elasticity and ductility into a subterranean well penetrated by a well bore and allowing the cement composition to set in the well.

It is, therefore, a general object of the present invention to provide improved resilient well cement compositions and methods.

Other and further objects, features and advantages of the present invention will be readily apparent to those skilled in the art upon a reading of the description of preferred embodiments which follows.

DESCRIPTION OF PREFERRED EMBODIMENTS

The present invention provides resilient well cement compositions having improved mechanical properties including elasticity and ductility and methods of utilizing the resilient cement compositions in cementing operations carried out in subterranean wells. While the compositions and methods are useful in a variety of well completion and remedial operations, they are particularly useful in primary cementing, i.e., cementing casings and liners in well bores including the cementing of multi-lateral subterranean wells.

A preferred well cement composition of this invention is basically comprised of a hydraulic cementitious material; rubber particles present in an amount in the range of from about 5% to about 50% by weight of hydraulic material in the composition and, more preferably, in an amount in the range of from about 10% to about 40% by weight of hydraulic material in the composition; and sufficient water to form a pumpable slurry.

Any suitable hydraulic cementitious material can be utilized in accordance with the present invention including those comprised of calcium, aluminum, silicon, oxygen and/or sulfur which set and harden by reaction with water. Such hydraulic materials include Portland cements, pozzolana cements, gypsum cements, high aluminum content cements, silica cements and high alkalinity cements. Portland cements are generally preferred for use in accordance with the present invention. Portland cements of the types defined and described in *API Specification For Materials And Testing For Well Cements*, API Specification 10, 5th Edition, dated Jul. 1, 1990 of the American Petroleum Institute are particularly suitable. Preferred API Portland cements include classes A, B, C, G and H, with API class H being the most preferred.

The rubber particles of the present invention are preferably derived from recycling automobile tires and are in the 10/20 to 20/30 mesh range. Such vulcanized rubber particles can be obtained from the Four D corporation, Duncan, Okla.

The water used in forming the cement compositions can be from any source provided it does not contain an excess of compounds that adversely affect other components in the cement composition. Generally, water is present in a cement slurry composition of this invention in an amount in the range of from about 25% to about 100% by weight of hydraulic material therein and, more preferably, in an amount in the range of from about 30% to about 75% by weight of hydraulic material therein.

Various dispersing agents can also be utilized in the cement compositions of this invention. The dispersing agent functions to facilitate the dispersal of the solids in the water, and allows the use of smaller amounts of water than is the case without the dispersing agent. While a variety of dispersing agents known to those skilled in the art can be utilized, a preferred dispersing agent is a water soluble polymer prepared by the caustic catalyzed condensation of formaldehyde with acetone wherein the polymer contains sodium sulfate groups. Such a preferred dispersing agent is commercially available under the trade designation CFR-3™ from Halliburton Energy Services of Duncan, Okla. The dispersing agent is generally included in a cement composition of this invention in an amount in the range of from about 0.1% to about 1.0%.

As is well understood by those skilled in the art, a variety of other components and additives can be included in the cement compositions of this invention including: fluid loss control additives, set retarding additives, dispersing agents, formation conditioning additives, set accelerators, lightweight extenders, and the like.

A method of cementing a subterranean zone penetrated by a well bore comprising the steps of forming a well cement composition comprised of a hydraulic cementitious material, rubber particles, and sufficient water to form a pumpable slurry; pumping the cement composition into the subterranean zone by way of the well bore; and allowing the cement composition to set into a hard impermeable mass therein.

The methods of this invention for cementing a subterranean zone penetrated by a well bore basically comprise the steps of forming a well cement composition comprised of a hydraulic cementitious material, rubber particles, and sufficient water to form a pumpable slurry; pumping the cement composition into the subterranean zone by way of the well bore; and allowing the cement composition to set into a hard impermeable mass therein.

In order to further illustrate the improved cement compositions and methods of this invention, the following examples are given.

EXAMPLES

Test samples of the cement compositions of this invention comprised of Portland cement, rubber particles, water, and a dispersing agent were prepared. Two of the test samples also included silica flour to help prevent loss of strength. Descriptions of the test samples are set forth in Tables 1–8 below. The test samples were then tested for expansion properties, compressive strength and shear bond strength.

TABLE 1

Expansion Properties of Cement Cured at 100° F. and 3,000 psi

| Cement | CFR-3[1] (% bwc) | Rubber[2] (% bwc) | Water (% bwc) | % Expansion (24 hrs) | % Expansion (7 days) |
|---|---|---|---|---|---|
| Class A | 0.0 | 0 | 46 | 0.10 | 0.21 |
| Class A | 0.2 | 10 | 46 | 0.28 | 0.41 |
| Class H | 0.0 | 0 | 38 | 0.00 | 0.08 |
| Class H | 0.2 | 10 | 38 | 0.16 | 0.26 |

[1]Condensation polymer product of a ketone, an aldehyde and sodium sulfite ("CFR-3 ™" from Halliburton Energy Services of Duncan, Oklahoma).
[2]10/20 mesh rubber particles derived from recycled automobile tires and obtained from Four D Corporation of Duncan, Oklahoma.

TABLE 2

Expansion Properties of Cement Cured at 200° F. and 3,000 psi

| Cement | CFR-3[1] (% bwc) | Rubber[2] (% bwc) | Water (% bwc) | % Expansion (24 hrs) | % Expansion (7 days) |
|---|---|---|---|---|---|
| Class H | 0.2 | 0 | 38 | 0.03 | 0.04 |
| Class H | 0.2 | 10 | 38 | 0.42 | 1.4 |
| Class H | 0.2 | 20 | 38 | 0.58 | 1.7 |

[1]Condensation polymer product of a ketone, an aldehyde and sodium sulfite ("CFR-3 ™" from Halliburton Energy Services of Duncan, Oklahoma).
[2]Rubber particles (approx. 1/4" average diameter) derived from recycled automobile tires and obtained from Four D Corporation of Duncan, Oklahoma.

TABLE 3

Expansion Properties of Cement Cured at 200° F. and 3,000 psi

| Cement | CFR-3[1] (% bwc) | Rubber[2] (% bwc) | NaCl (% bwc) | Water (% bwc) | SSA-1[3] (% bwc) | % Expansion (24 hrs) | % Expansion (6 days) | % Expansion (11 days) |
|---|---|---|---|---|---|---|---|---|
| Class H | 0.1 | 0 | 0 | 38 | 0 | 0.07 | 0.09 | 0.11 |
| Class H | 0.1 | 40 | 0 | 38 | 0 | 0.25 | 0.77 | 0.88 |
| Class H | 0.1 | 0 | 18 | 38 | 0 | 0.13 | 0.13 | 0.16 |
| Class H | 0.1 | 40 | 18 | 38 | 0 | 0.44 | 1.0 | 1.2 |
| Class H | 0.1 | 0 | 37.2 | 54 | 35 | 0.08 | 0.08 | 0.10 |
| Class H | 0.1 | 40 | 37.2 | 54 | 35 | 0.24 | 0.50 | 0.57 |

[1]Condensation polymer product of a ketone, an aldehyde and sodium sulfite ("CFR-3 ™" from Halliburton Energy Services of Duncan, Oklahoma).
[2]10/20 mesh rubber particles derived from recycled automobile tires and obtained from Four D Corporation of Duncan, Oklahoma.
[3]Fine silica flour ("SSA-1 ™" from Halliburton Energy Services of Duncan, Oklahoma).

TABLE 4

Expansion Properties of Cement Cured at 300° F. at 3,000 psi

| Cement | CFR-3[1] (% bwc) | Rubber[2] (% bwc) | Water (% bwc) | SSA-2[3] (% bwc) | % Expansion (24 hrs) | % Expansion (7 days) |
|---|---|---|---|---|---|---|
| Class H | 0.2 | 0 | 38 | 35 | 0.02 | 0.04 |
| Class H | 0.2 | 10 | 38 | 35 | 1.7 | 2.0 |
| Class H | 0.2 | 20 | 38 | 35 | 1.4 | 1.6 |
| Class H | 0.2 | 30 | 38 | 35 | 0.6 | 0.8 |

[1]Condensation polymer product of a ketone, an aldehyde and sodium sulfite ("CFR-3 ™" from Halliburton Energy Services of Duncan, Oklahoma).
[2]10/20 mesh rubber particles derived from recycled automobile tires and obtained from Four D Corporation of Duncan, Oklahoma.
[3]Silica flour ("SSA-2 ™" from Halliburton Energy Services of Duncan, Oklahoma).

TABLE 5

Expansion Properties of Cement Cured at 160° F. and 3,000 psi

| Cement | CFR-3[1] (% bwc) | Rubber[2] (% bwc) | Rubber[2] (mesh) | Water (% bwc) | % Expansion (24 hrs) | % Expansion (4 days) |
|---|---|---|---|---|---|---|
| Class H | 0.1 | 20 | 10/20 | 38 | 0.42 | 0.76 |
| Class H | 0.2 | 40 | 10/20 | 38 | 0.53 | 0.89 |
| Class H | 0.1 | 20 | 20/30 | 38 | 0.02 | 0.22 |
| Class H | 0.2 | 40 | 20/30 | 38 | 0.22 | 0.44 |

[1]Condensation polymer product of a ketone, an aldehyde and sodium sulfite ("CFR-3 ™" from Halliburton Energy Services of Duncan, Oklahoma).
[2]Rubber particles derived from recycled automobile tires and obtained from Four D Corporation of Duncan, Oklahoma.

TABLE 6

Expansion Properties of Cement Cured at 220° F. and 3,000 psi

| Cement | CFR-3[1] (% bwc) | Rubber[2] (% bwc) | Rubber[2] (mesh) | Water (% bwc) | % Expansion (24 hrs) | % Expansion (7 days) |
|---|---|---|---|---|---|---|
| Class H | 0.2 | 0 | — | 38 | 0.03 | 0.04 |
| Class H | 0 | 40 | 10/20 | 38 | 0.51 | 1.0 |
| Class H | 0.2 | 20 | 10/20 | 38 | 0.83 | 1.1 |
| Class H | 0.2 | 40 | 10/20 | 38 | 0.93 | 1.6 |
| Class H | 0 | 40 | 20/30 | 38 | 0.68 | 1.0 |
| Class H | 0.2 | 20 | 20/30 | 38 | 0.54 | 0.74 |
| Class H | 0.2 | 40 | 20/30 | 38 | 0.60 | 0.79 |

[1]Condensation polymer product of a ketone, an aldehyde and sodium sulfite ("CFR-3 ™" from Halliburton Energy Services of Duncan, Oklahoma).
[2]Rubber particles derived from recycled automobile tires and obtained from Four D Corporation of Duncan, Oklahoma.

TABLE 7

Compressive Strength of Cement Cured at 200° F. and 3,000 psi

| Cement | CFR-3[1] (% bwc) | Rubber[2] (% bwc) | Rubber[2] (mesh) | Water (% bwc) | Compressive Strength 24 hrs (psi) |
|---|---|---|---|---|---|
| Class H | 0.0 | 0 | — | 38 | 6180 |
| Class H | 0.1 | 30 | 10/20 | 38 | 1680[3] |
| Class H | 0.1 | 30 | 20/30 | 38 | 1940[4] |

[1]Condensation polymer product of a ketone, an aldehyde and sodium sulfite ("CFR-3 ™" from Halliburton Energy Services of Duncan, Oklahoma).
[2]Rubber Particles derived from recycled automobile tires and obtained from Four D Corporation of Duncan, Oklahoma.
[3]When cured for 7 days at 160° F., cement had a Young's Modulus of 0.206 × 10[6] and a Poisson's Ratio of 0.0281.
[4]When cured for 7 days at 160° F., cement had a Young's Modulus of 0.425 × 10[6] and a Poisson's Ratio of 0.0453.

TABLE 8

Shear Bond of Cement Cured at 220° F. and 3,000 psi

| Cement | CFR-3[1] (% bwc) | Rubber[2] (% bwc) | Rubber[2] (mesh) | Water (% bwc) | Shear Bond (7 days) (psi) |
|---|---|---|---|---|---|
| Class H | 0.2 | 0 | — | 38 | 620 |
| Class H | 0.2 | 20 | 10/20 | 38 | 1280 |
| Class H | 0.2 | 30 | 10/20 | 38 | 820 |
| Class H | 0.2 | 40 | 10/20 | 38 | 840 |
| Class H | 0.2 | 20 | 20/30 | 38 | 1050 |
| Class H | 0.2 | 30 | 20/30 | 38 | 820 |
| Class H | 0.2 | 40 | 20/30 | 38 | 810 |

[1]Condensation polymer product of a ketone, an aldehyde and sodium sulfite ("CFR-3 ™" from Halliburton Energy Services of Duncan, Oklahoma).
[2]Rubber particles derived from recycled automobile tires and obtained from Four D Corporation of Duncan, Oklahoma.

From the results set forth in Tables 1–6, it can be seen that the cement compositions of this invention which contain rubber particles have excellent expansion properties, compressive strength, shear bond, and elasticity and ductility as measured by Young's Modulus and Poisson's Ratio.

In oil and gas well cementing operations, it is generally desirable to have a pumpable slurry for between 4 and 6 hours, depending on the depth of the well, to permit sufficient time to complete the pumping operations. Generally, a set time of less than 24 hours is desired. Set time is defined as achieving a compressive strength of a least 50 psi. Therefore, from the results shown in Table 7, it can be seen that cement compositions of the present invention, which contain rubber particles, develop desired compressive strengths within 24 hours.

The shear bond strength of set cement in the annulus between a pipe disposed in a well bore and the walls of the well bore is defined as the strength of the bond between the set cement and a pipe mechanically supported by the cement. The test sample shear bond strengths were determined by measuring the force required to initiate movement of pipe sections cemented by the test samples in test apparatus simulating a well bore, i.e., larger diameter pipe sections. The determined forces were divided by the cement-pipe contact surface areas to yield the shear bond strengths in psi. Thus, from the results shown in Table 8, it can be seen that the cement compositions of this invention, which contain rubber particles, develop excellent shear bond strengths.

Thus, the present invention is well adapted to carry out the objects and advantages mentioned as well as those which are inherent therein. While numerous changes may be made by those skilled in the art, such changes are encompassed within the spirit of this invention as defined by the appended claims.

What is claimed is:

1. A method of cementing a subterranean zone comprising the steps of:

forming a pumpable well cement composition comprised of a hydraulic cementitious material, rubber consisting essentially of vulcanized rubber particles, and sufficient water to form the pumpable composition;

pumping the cement composition into the subterranean zone; and allowing the cement composition to set into a hard impermeable mass therein.

2. The method of claim 1 wherein the hydraulic cementitious material is selected from the group of Portland cements, pozzolana cements, gypsum cements, high aluminum content cements, silica cements, and high alkalinity cements.

3. The method of claim 1 wherein the rubber particles are present in an amount sufficient to increase expansion properties of the composition.

4. The method of claim 1 wherein the rubber particles are present in an amount in a range of from about 5% to about 50% by weight of hydraulic material in the composition.

5. The method of claim 1 wherein the rubber particles have an average diameter of about ¼ inch or less.

6. The method of claim 1 wherein the rubber particles are derived from recycled automobile tires.

7. The method of claim 1 wherein the water is present in an amount in a range of from about 25% to about 100% by weight of hydraulic material in the composition.

8. The method of claim 1 wherein the composition includes a dispersing agent.

9. The method of claim 8 wherein the dispersing agent is present in a range of from about 0.1% to about 1.0% by weight of hydraulic material in the composition.

10. The method of claim 8 wherein the dispersing agent is comprised of a water soluble polymer prepared by caustic catalyzed condensation of an aldehyde with a ketone and wherein the polymer contains sodium sulfate groups.

* * * * *